United States Patent [19]
Taniguchi et al.

[11] 3,863,317
[45] Feb. 4, 1975

[54] HOB

[75] Inventors: Hiroshi Taniguchi, Akashi; Tatuo Tanimoto, Kakogawa, both of Japan

[73] Assignee: Kobe Steel, Ltd., Kobe, Japan

[22] Filed: May 30, 1974

[21] Appl. No.: 474,545

Related U.S. Application Data

[63] Continuation-in-part of Ser. No. 267,417, June 29, 1972, abandoned.

[52] U.S. Cl. ............................................. 29/103 B
[51] Int. Cl. ............................................... B26d 1/12
[58] Field of Search ...................... 29/103 R, 103 B

[56] References Cited
UNITED STATES PATENTS

| | | | |
|---|---|---|---|
| 1,512,657 | 10/1924 | Wildhaber | 29/103 B |
| 3,374,518 | 3/1968 | Beitjens | 29/103 B |

FOREIGN PATENTS OR APPLICATIONS

| | | | |
|---|---|---|---|
| 1,195,084 | 6/1970 | Great Britain | 29/103 B |

*Primary Examiner*—Harrison L. Hinson
*Attorney, Agent, or Firm*—Oblon, Fisher, Spivak, McClelland & Maier

[57] ABSTRACT

A hob for machining teeth of gear wheels comprising a plurality of longitudinally extending rows of tooth elements, arranged in succession along a helical line extending around the longitudinal axis of the hob, wherein the shoulder portions of the trailing sides of some of the tooth elements are reduced from their basic contours to such an extent that such teeth having reduced trailing sides do not engage in the cutting operation, whereby the amount of cutting to be performed by the trailing sides of the remaining unmodified tooth elements is increased and the increased wear of the trailing sides of the tooth elements, due to a small amount of cutting being normally performed by such sides, as compared with that done by the leading sides, is avoided.

11 Claims, 14 Drawing Figures

HOB

CROSS-REFERENCE TO RELATED APPLICATION

This is a continuation-in-part application of application Ser. No. 267,417, filed June 29, 1972, now abandoned.

BACKGROUND OF THE INVENTION

1. Field of the Invention

The present invention relates generally to hobs and more particularly to an improved hob for machining teeth of gear wheels by the generation method.

2. Description of the Prior Art

Although conventional hobs for machining teeth of gear wheels may have teeth having any one of a variety of shapes depending upon the particular operations for which the gear wheels are to be adapted, generally the hobs are screw-threaded type milling cutters having a rack of teeth, each tooth of which is of an involute configuration. Consequently, when a gear wheel is machined by a hob of this kind, by the generation method, the cutting edges at the opposite sides of each tooth element of the hob are simultaneously engaged in the cutting operation.

Under such conditions, however, the tooth elements of the hob encounter a relatively high cutting resistance, and are often subjected to severe vibration due to a resonant effect caused by the cutting forces which are being applied to the opposite sides thereof. Furthermore, when each tooth element of the hob has its opposite cutting edges simultaneously engaged in the machining or cutting operation, the amount of cutting being performed at the trailing cutting edge or side is less than that being performed at the leading cutting edge or side of each tooth element, whereby the wear of the trailing cutting edtes is consequently greater than the wear occurring at the leading sides or edges due to an insufficient amount of use of the trailing edges. Such increased wear of the trailing edges or sides of each tooth element is further aggravated by interference of the trailing cutting edges with the machine shavings which lodge mostly in the vicinity of the trailing edge portions of each tooth element.

Furthermore, the increased wear of the trailing cutting edges of each tooth element cooperates with the vibration impressed upon each tooth element, due to the resonant effect as described hereinabove, to substantially shorten the service life of the hob, and still further, sometimes the tooth elements of the hob become nicked or broken before the expiration of the normal wear period, such also necessitating their replacement or repair prior to the termination of the expected service life of the hob.

SUMMARY OF THE INVENTION

Accordingly, it is an object of the present invention to provide an improved hob for machining teeth of gear wheels by the generation method.

Another object of the present invention is to provide an improved hob which will have a greatly increased service life.

Still another object of the present invention is to provide an improved hob which will greatly reduce the wear at the trailing cutting edges of its tooth elements.

Yet another object of the present invention is to provide an improved hob which will greatly reduce the amount of vibration normally impressed upon the tooth elements.

The foregoing objectives are achieved according to this invention through the provision of a hob having tooth elements arranged in succession along a helical line positioned around its longitudinal axis, wherein the shoulder portions of the trailing edges or sides of some of the tooth elements are reduced from their basic contours to such an extent that the modified or reduced trailing portions of such teeth do not engage in the machining or cutting operation. By reducing the contours of the trailing edges or sides of some of the tooth elements, such as, for example, of every second, third, or fourth tooth element the amount of cutting that must be performed by the remaining unreduced tooth elements is accordingly increased, such as, for example, by one hundred, fifth, or thirty-three per cent, respectively, whereby the increased wear, due to a small amount of cutting being performed, at the trailing edges of the tooth elements, is avoided. The reduction of the trailing side or edge portions from their contours may be made along any suitable curve which joins smoothly with the unmodified basic contour of the tooth element, and in actuality, may follow an arc, elliptical curve, parabolic curve, hyperbolic curve, helicoidal curve, Archimedean curve, or the like.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENTS

Figure 1:
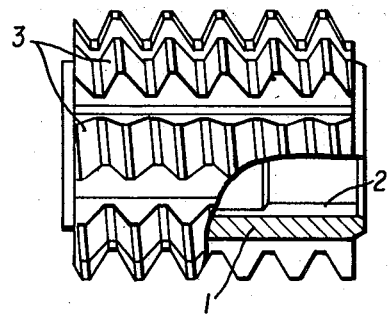
FIG. 1 is a front view of a hob constructed according to this invention, with a portion thereof being broken away from the purpose of illustration.

Referring now to the drawings, and more particularly to FIG. 1 thereof, there is shown a hob having a generally conventional structure along with which this invention can be adapted. The hob comprises a cylindrical body 1 having an axially aligned central bore 2 for mounting the hob to a rotating spindle of a hobbing machine. A plurality of longitudinally extending rows of tooth elements 3 are disposed upon the outer surface of body 1, each tooth element 3 also being successively arranged along a helical line extending around the longitudinal axis of the body 1.

Figure 2:
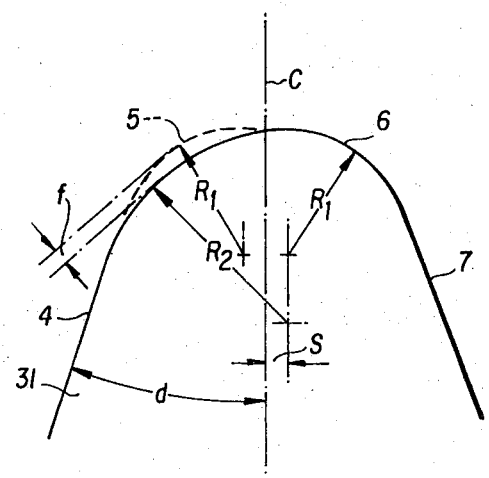
FIG. 2 is a schematic view of the contour of the cutting edges of a tooth element of a hob constructed according to this invention, such especially disclosing the manner in which the contour of the trailing side of the tooth element is reduced.

Referring now to FIG. 2, the contour of the cutting edge of a tooth element 3 is illustrated, the basic unmodified contour of the tooth element being defined by a continuous curve 4–5–6–7, which substantially includes a straight line portion 4 having an inclination $\alpha$ with respect to the center line C of the tooth contour, arcs 5 and 6 of a radius $R_1$ respectively located upon opposite sides of the center line C, the center of each arc being positioned at a locus laterally offset from the center line C by a distance S, and a straight line portion 7 positioned symmetrically with respect to the line 4 but upon the opposite side relative to the center line C. The contour of the cutting edge as defined by the curve 4–5–6–7 is one of the standard contours prescribed in the Japanese Industrial Standard.

Still referring to FIG. 2, when the contour of the trailing side or edge of the particular tooth element is to be reduced along an arc corresponding to a maximum reduction of an amount f, with the condition that the arc defining the reduction joins smoothly with the remaining unmodified portions of the basic contour, the radius $R_2$ of such arc can be obtained from the following relation:

$$f = R_1 + 2 \cdot S/\sin(90 - \alpha/2) - R_2$$

where the locus of the center of such arc is likewise laterally offset relative to center line C by a distance S, but is situated on the side of the center line C opposite the reduced arc portion.

Figure 3:
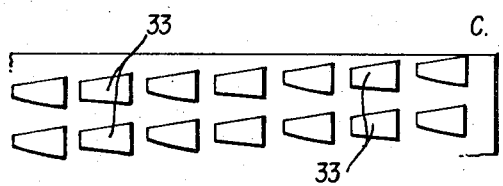
FIG. 3 is a schematic view of an arrangement of the tooth elements of a hob constructed according to this invention wherein the reduction in the contour of the trailing edge of the tooth elements is affected with every one of the successively arranged tooth elements.

The reduction in the contour of the trailing side of the tooth element may be offset upon every other one of the tooth elements, as schematically disclosed in the embodiment of FIG. 3, in which case, the amount of cutting to be performed by the unreduced or unmodified trailing sides of the tooth elements increases two-fold as compared to that being performed by the trailing sides of a conventional hob.

Figure 4:
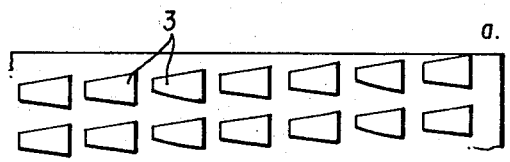
FIG. 4 is a schematic view of another arrangement of the tooth elements of a hob constructed according to this invention wherein the reduction in the contour of the trailing side of the tooth elements is affected with every third one of the successively arranged tooth elements.
Figure 6A:
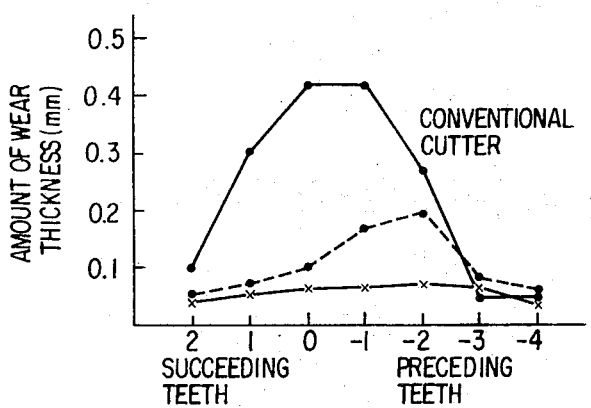
FIGs. 6a – 6g are graphical plots of the amount of wear of particularly located teeth, and particular portions of such teeth, of a conventional hob and hobs having the structure modified in accordance with the present invention.
Figure 6D:
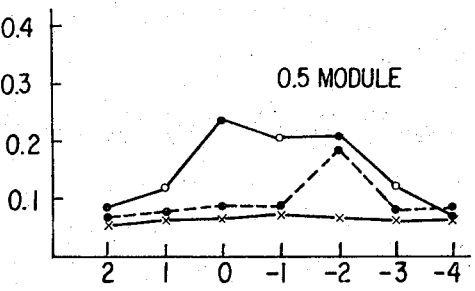
Figure 6B:
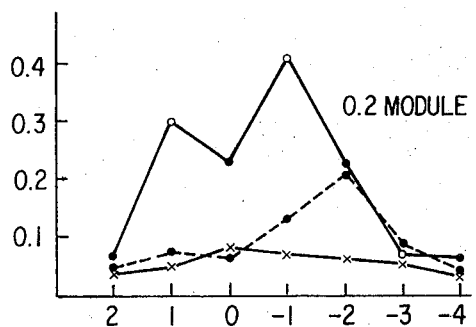
Figure 6E:
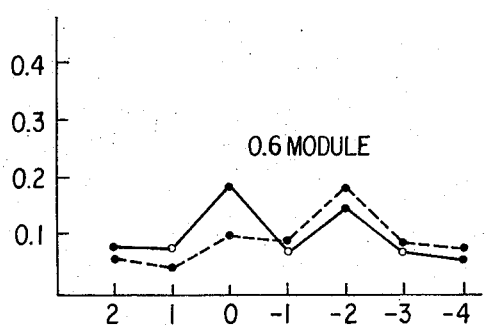
Figure 6C:
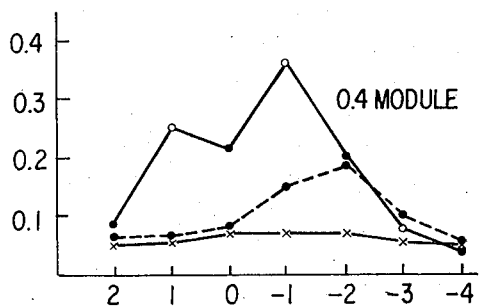
Figure 6F:
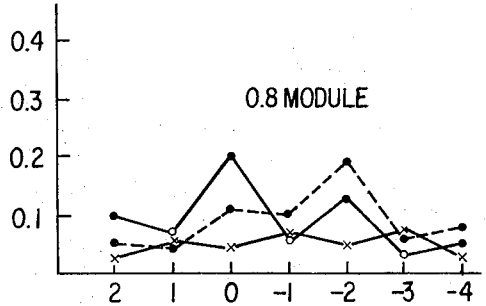
Figure 6G:
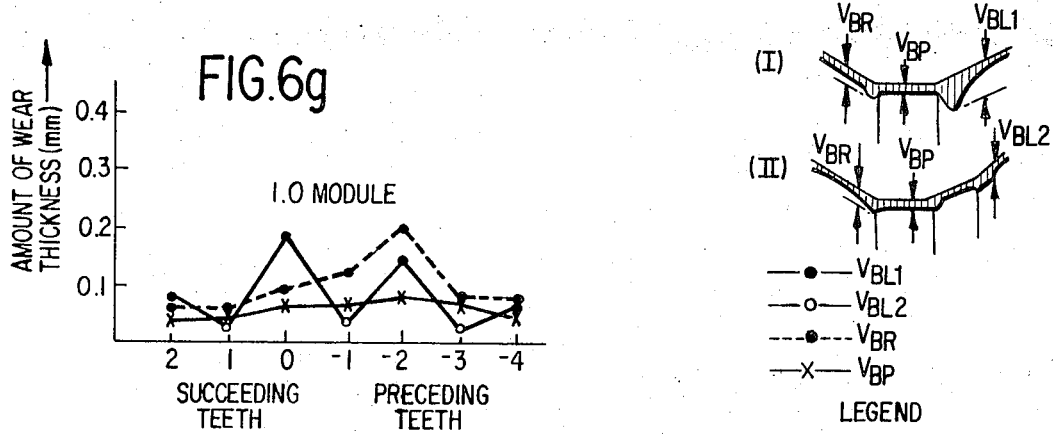

Referring now to FIG. 4, another embodiment is disclosed wherein the reduction in the contour of the trailing sides of the tooth elements is effected upon every third one of the tooth elements. In this embodiment, the amount of cutting to be performed by the unreduced or unmodified trailing edges or sides of the tooth elements is increased by as much as fifty per cent as compared to that being performed by the trailing sides of a conventional hob.

Thus, by selecting the frequency, the amount, and the contour of reduction of the trailing sides of the tooth elements, it is possible to attain the most favorable cutting condition according to the respective conditions of cutting being encountered.

Moreover, extensive experimentation has shown that the trailing side cutting face of each tooth should be reduced from the top end surface of the tooth, to a position along the side surface of the tooth, the distance defining such position being equal to 0.6 – 1.0 modules, wherein module is conventionally defined as the pitch diameter of the gear wheel or hob divided by the number of teeth thereon. It must be emphasized that only the trailing side, relative to the symmetric center line of the basically unmodified tooth contour, should be reduced in accordance with the present invention, and that in conjunction therewith, it is further noted that if the trailing side portions of some of the tooth elements are reduced from the top end surface, to positions along the side surfaces of the teeth, the distances defining such positions being greater than 1.0 module, the tooth profile error becomes too great. More particularly, when for example, the trailing side contours of half of the tooth elements are modified or reduced in accordance with the present invention, polygonal error is apt to occur within the gear to be machined if the modified distance extends beyond 1.0 module.

In addition, relative to the cutting or machining conditions, the hob configuration within the vicinity of the intermeshing pitch circle is quite critical for ensuring precise cutting operations, and it is therefore necessary to maintain the integrity or preciseness of the cutting face configuration within the aforenoted vicinity of the intermeshing pitch circle. With respect to the tooth elements of typical gear cutters, the pitch circle is normally situated at a distance equal to 1.0 – 1.5 modules from the top end surface of the tooth element, and accordingly, it is not desirable to modify or reduce the cutting face of the teeth beyond distances equal to 1.0 module.

Similarly, if the modifications or reductions extend to distances less than 0.6 module from the top end surface of the tooth elements, the reduced portion will nevertheless engage in the cutting operation and consequently, the objects of the present invention will not be achieved. In addition, it should also be noted that with respect to the top end surface, if the reduction or modification extends beyond the symmetric center line of the tooth so as to include a portion of the leading cutting face, the bottom portion of the gear groove will not be properly formed.

EXAMPLE

Figures 5A, 5B:
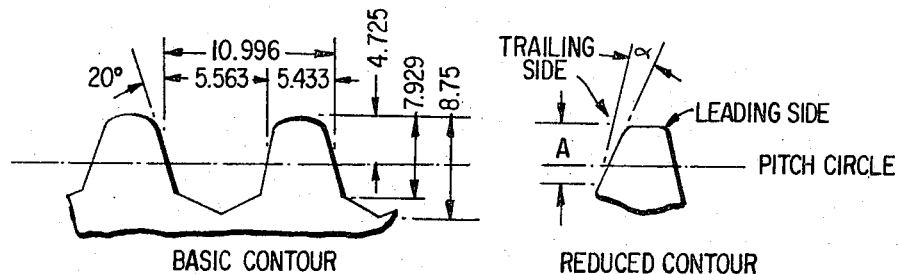
FIGS. 5a and 5b are schematic views of the basic and reduced contours of hob teeth according to the prior art and the present invention, respectively.

The unique features of the present invention may be made even more apparent with reference now being made to exemplary data derived from extensive experimentation with respect to various contour modifications of the different hob tooth elements. FIG. 5 shows the contour configurations of the cutting faces of several teeth of basically contoured, conventional hobs and of a modified or reduced hob according to the present invention, respectively, and in conjunction therewith, Tables 1 – 3 disclose the characteristic parameters of the particularly configured gear and hob, and the cutting conditions attending the machining operation, respectively, while Table 4 discloses the various reductions or modifications which may be impressed upon the various hob teeth so as to attain different configurations thereof, such to be read in conjunction with FIG. 5b and FIGS. 6b – 6g.

Referring more particularly to FIG. 6 wherein the amount of wear of several of the hob teeth, as well as portions of the individual teeth is disclosed, the numerals disposed along the horizontal axes of the graphical Table 1

| | |
|---|---|
| (gear) | |
| module | 3.5 |
| pressure angle | 20° |
| number of teeth | 32 |
| helix angle | 0° |
| material | SCM 21 (J.I.S.) Cr-Mo low alloy steel |
| hardness | $H_B$ 140–150 |

Table 2

| | (hob) |
|---|---|
| Outer Diameter | 104° |
| Number of Starts | 2 |
| Lead Angle | 4° 15, |
| Rake Angle | 6° |
| Number of Cutters | 12 |
| Groove Lead | ∞ |

Table 3

| (Cutting Conditions) | |
|---|---|
| Cutting Speed | 60m/min. |
| Feed Rate | 2.0mm/rev |
| Cutting Style | Crimb Cutting |
| Coolant | Fatty Chloride Oil |
| Machine | Curl Hurth WF 10 |
| Number of Gears to be Cut | 80 |
| Shift | Non |

Table 4

| | (Reduction) |
|---|---|
| A (mm) | α = 5° Module |
| 0.7 | 0.2 (b) |
| 1.4 | 0.4 (c) |
| 1.75 | 0.5 (d) |
| 2.1 | 0.6 (e) |
| 2.8 | 0.8 (f) |
| 3.5 | 1.0 (g) | figures refer to the individual, particular tooth elements, wherein more specifically the numeral 0 denotes the tooth elements disposed along the generation center of the hob, while the numerals −1, −2, −3, −4 denote preceding or leading tooth elements, and the numerals 1, 2, similarly denote succeeding or reaving tooth elements. The amount of wear is graphically indicated upon the vertical axes of the graphs, such amounts of wear being dependent upon the reduction amount as successively noted in Table 4 and FIGS. 6b – 6g.

Figure 7:
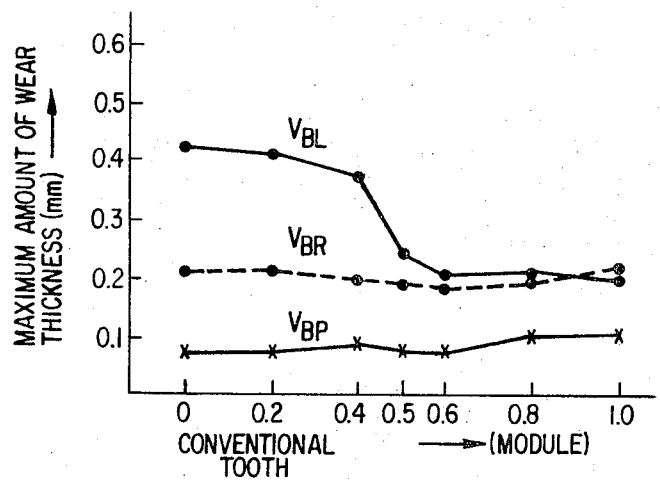
FIG. 7 is a graphical plot of the maximum amount of wear of the tooth portions of the hob teeth of the various hobs diagrammatically illustrated in FIGS. 6a – 6g.

In addition, the amount of wear is also graphically shown in such figures with respect to the unmodified, basic contour of a conventional hob with respect to a modified contour of a hob constructed in accordance with the present invention, such being designated (I) and (II), respectively, within the legend of FIG. 6, wherein the various portions of the teeth, the wear of which is desired to be examined and observed, are denoted $V_{BL1}$, $V_{BL2}$, $V_{BR}$ and $V_{BP}$. Furthermore, FIG. 7 summarizes the results shown in FIGS. 6a – 6g whereby the maximum amount of wear of the various portions of the differently configured teeth are plotted as functions of the extent of the reductions or modifications, and it is apparent from such Figure that the amount of wear is radically or substantially reduced when the modification is extended to distances within the range of 0.6 – 1.0 modules as measured from the top end surface of the tooth elements. If the modification distance is less than 0.6 module, the reduced portion nevertheless engages in the cutting operation and substantial wearing of tooth portion $V_{BL}$ is encountered. Similarly, it should also be noted that the intersecting angle, which of course is measured in degrees, between the basic unmodified contour and a line tangent to the reduced contour at the distance of 0.5 module should be more than two times the number of starts, that is, the number of threads or spiral beginnings. This factor is quite crucial to the cutting operation because if the formed angle were less than the required amount, the reduced portion would nevertheless engage in the cutting operation, resulting in as much wear as is presently experienced with conventional hobs.

It is also noted that each of the reduced trailing sides of the tooth elements are formed in such a manner that the intersecting line between the reduced surfaces and the top end surfaces of each tooth element is disposed parallel to the intersecting line between the reduced surfaces and the basically contoured trailing side surfaces, such intersecting lines being disposed longitudinally with respect to the hob axis and extending in the circumferential direction about the longitudinal axis of the hob.

Obviously numerous modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A hob comprising:
    a cylindrical body portion having a longitudinal axis; and
    tooth elements arranged in succession along a helical line extending around said longitudinal axis of said hob wherein the shoulder portions of the trailing sides of some of said tooth elements are reduced from their basic contour,
    said reductions extending from the top end surfaces of said tooth elements to positions along said trailing sides which are disposed within the range of 0.6 – 1.0 modules, the intersecting angle, as measured in degrees, between the basic contour and a line tangent to said reduced contour at a position of 0.5 module being greater than two times the number of starts upon said hob, and wherein the leading sides of said tooth elements relative to the symmetric line of the basic contour of said elements, are unmodified,
    whereby said reduced trailing sides of said tooth elements do not engage in the cutting operation.

2. A hob as set forth in claim 1, wherein the reduction is effected along an arc which joins smoothly with the remaining, unmodified basic contour portion of said tooth element.

3. A hob as set forth in claim 1, wherein the reduction is effected along an elliptical curve which joins smoothly with the remaining, unmodified basic contour portion of said tooth element.

4. A hob as set forth in claim 1, wherein the reduction is effected along a parabolic curve which joins smoothly with the remaining unmodified basic contour portion of said tooth element.

5. A hob as set forth in claim 1, wherein the reduction is effected along a hyperbolic curve which joins smoothly with the remaining unmodified basic contour portion of said tooth element.

6. A hob as set forth in claim 1, wherein the reduction is effected along a helicoidal curve which joins smoothly with the remaining, unmodified basic contour portion of said tooth element.

7. A hob as set forth in claim 1, wherein the reduction is effected along an Archimedean curve which joins smoothly with the remaining, unmodified basic contour portion of said tooth element.

8. A hob as set forth in claim 1, wherein the reduction is effected upon every other one of said tooth elements arranged in succession along said helical line.

9. A hob as set forth in claim 1, wherein the reduction is effected upon every third one of said tooth elements arranged in succession along said helical line.

10. A hob as set forth in claim 1, wherein the reduction is effected upon every fourth one of said tooth elements arranged in succession along said helical line.

11. A hob as set forth in claim 1, wherein each of said reduced trailing sides of said tooth elements are formed in such a manner that the intersecting line between said reduced surfaces and the top end surfaces of each tooth element is disposed parallel to the intersecting line between said reduced surfaces and the basically contoured trailing side surfaces, said intersecting lines being disposed longitudinally with respect to the hob axis and extending in the circumferential direction about the longitudinal axis of said hob.

* * * * *